United States Patent [19]

Solc nee Hajna

[11] 4,421,660

[45] Dec. 20, 1983

[54] COLLOIDAL SIZE HYDROPHOBIC POLYMERS PARTICULATE HAVING DISCRETE PARTICLES OF AN INORGANIC MATERIAL DISPERSED THEREIN

[75] Inventor: Jitka Solc nee Hajna, Midland, Mich.

[73] Assignee: The Dow Chemical Company, Midland, Mich.

[21] Appl. No.: 216,695

[22] Filed: Dec. 15, 1980

[51] Int. Cl.³ .................. C08K 3/10; C08K 3/34; H01F 1/28; H01F 1/00

[52] U.S. Cl. .................. 252/62.54; 523/202; 523/300; 524/425; 524/431; 524/432; 524/435; 524/445; 524/458; 524/461; 524/773; 524/777; 524/780; 524/783; 524/785; 524/788; 524/789; 524/800; 524/819; 524/824; 524/832; 524/836

[58] Field of Search ........ 260/42.14, 42.53, 29.6 MM, 260/29.6 R; 252/62.54; 524/832, 836, 819, 431, 780, 785, 788, 783, 800, 789, 773, 824, 413; 523/300, 202

[56] References Cited

U.S. PATENT DOCUMENTS

| | | | |
|---|---|---|---|
| 2,644,772 | 7/1953 | Kaye | 260/42.53 |
| 2,984,635 | 5/1961 | Harris | 428/403 |
| 3,281,344 | 10/1966 | Thomas | 524/300 |
| 3,301,810 | 1/1967 | Hunter et al. | 523/300 |
| 3,383,346 | 5/1968 | Smith | 260/42.14 |
| 3,502,582 | 3/1970 | Clemens et al. | 260/42.53 |
| 3,544,500 | 12/1970 | Osmond et al. | 260/29.6 RW |
| 3,575,917 | 4/1971 | Kappal | 523/300 |
| 3,884,871 | 5/1975 | Herman et al. | 260/42.14 |
| 3,897,586 | 7/1975 | Coker | 428/403 |
| 4,023,981 | 5/1977 | Perronin et al. | 428/403 |
| 4,036,652 | 7/1977 | Rothmayer | 260/42.55 |
| 4,048,380 | 4/1977 | Blakey et al. | 260/42.55 |
| 4,067,840 | 1/1978 | Wolf | 260/29.6 MM |
| 4,071,670 | 1/1978 | Vanzo et al. | 260/42.53 |
| 4,157,323 | 6/1979 | Yen et al. | 260/29.7 M |
| 4,166,152 | 8/1979 | Baker et al. | 260/29.6 R |
| 4,194,920 | 3/1980 | Burke et al. | 524/783 |
| 4,206,094 | 6/1980 | Yen et al. | 260/8 |
| 4,213,885 | 7/1980 | Boberg et al. | 260/29.6 TA |
| 4,221,697 | 9/1980 | Osborn et al. | 260/42.53 |
| 4,254,201 | 3/1981 | Sawai et al. | 428/403 |
| 4,264,700 | 4/1981 | Bayley | 260/42.53 |
| 4,339,337 | 7/1982 | Tricot et al. | 524/431 |
| 4,358,388 | 11/1982 | Daniel et al. | 252/62.54 |

OTHER PUBLICATIONS

Derwent Abst. 57718V/32 (7-13-74) Mitsubishi (J74026938).
CA 96(6)35928T EP38730 10-28-1981.

*Primary Examiner*—John C. Bleutge
*Assistant Examiner*—Herbert J. Lilling
*Attorney, Agent, or Firm*—M. S. Jenkins; Grace S. S.

[57] ABSTRACT

Colloidal size particles of an inorganic solid such as magnetic iron oxide or titanium dioxide are encapsulated in a hydrophobic addition polymer such as a polymer of styrene by a polymerization process wherein a water-immiscible (hydrophobic) monomer is dispersed in an aqueous colloidal dispersion of the inorganic particles and subjected to conditions of emulsion polymerization. The resulting encapsulated particles are usefully employed as catalysts, toners, pigments and diagnostic latexes that have magnetic characteristics.

21 Claims, No Drawings

COLLOIDAL SIZE HYDROPHOBIC POLYMERS PARTICULATE HAVING DISCRETE PARTICLES OF AN INORGANIC MATERIAL DISPERSED THEREIN

BACKGROUND OF THE INVENTION

This invention relates to colloidal size particulates containing particles of an inorganic material and to polymerization processes used to prepare such particulates.

Metals, metal oxides, pigments, fillers and other inorganic particulates that tend to agglomerate are often coated with or encapsulated in hydrophobic polymers. These coated or encapsulated particles are often used in a wide variety of applications such as electroconductive additives to plastics, toners in electrophotographic applications, pigmented paints as well as many other applications.

Conventionally, such particulates are prepared by (1) treating the inorganic solid with acid, a combination of acid and base, alcohol or a polymer solution; (2) dispersing an addition polymerizable monomer in an aqueous dispersion of a treated inorganic solid and (3) subjecting the resulting dispersion to emulsion polymerization conditions. Examples of such methods are described in U.S. Pat. Nos. 4,048,136; 3,383,346; 3,935,340; 3,544,500 and 3,884,871. Unfortunately, these methods are deficient in that they often require expensive multi-step procedures, anchoring agents, functional additives, stabilizing agents and the like. Also, the polymeric particulates often must be employed as viscous pastes or dry powders.

In view of the deficiencies of the prior art methods for preparing such particulates, an improved method which eliminates or substantially reduces the adverse affects of the aforementioned procedure deficiencies is highly desirable.

SUMMARY OF THE INVENTION

In one aspect, the present invention is such an improved method which comprises the steps of (1) emulsifying a hydrophobic, emulsion polymerizable monomer in an aqueous colloidal dispersion of discrete particles of an inorganic solid and (2) subjecting the resulting emulsion to emulsion polymerization conditions to form a stable, fluid aqueous colloidal dispersion of the inorganic solid particles dispersed in a matrix of a water-insoluble polymer of the hydrophobic monomer. Surprisingly, dispersion of the inorganic solid particles into the polymer matrix is achieved by a process having an emulsion polymerization step without pretreating the particles with polymer, acid or other conventional anchoring agent prior to the emulsion polymerization step. Also, in the colloidal size polymer matrix having the inorganic solid dispersed therein, the inorganic solid particles remain in a discrete, essentially nonagglomerated form. Hereinafter, this colloidal-size matrix is called "matrix particulate" or "matrix particles." Thus, the discrete inorganic solid particles are entirely coated with polymer. Moreover, in many particles of the particulate (colloidal-size polymer matrix), two or more inorganic particles reside in a spaced apart relationship.

In another aspect, this invention is the aforementioned matrix particulate. In the matrix particles, the inorganic particles exist as discrete (nonaggregated) particles, each being surrounded by the polymer matrix.

The matrix particulates of this invention are particularly useful in applications requiring a colloidal size particulate having magnetic properties. Examples of such applications include (1) the separation of a water-miscible fluid from a water-immiscible fluid as described in U.S. Pat. No. 4,108,767; (2) clarification processes as described in U.S. Pat. Nos. 4,089,779 and 4,110,208; and (3) the absorption of e.l.m. radiation. Such matrix particulates are also useful in magnetic paints, electrically resistive barriers and moldable magnetic powders, as toners in electrophotographic applications, electroconductive additives for plastics, pigments in paint and ink formulations and pigmentary core latexes. Such particulates are suitably employed as diagnostic materials in human and animal health applications such as described in *Nature*, Vol. 270, pp. 259–261 (Nov. 17, 1977); *Science*, Vol. 200, pp. 1074–1076 (June 2, 1978) and U.S. Pat. No. 4,157,323; and as catalysts such as described in U.S. Pat. No. 4,157,323.

DETAILED DESCRIPTION OF ILLUSTRATIVE EMBODIMENTS

Inorganic solids suitably employed in the practice of this invention are inorganic materials in the form of colloidal particles, i.e., have diameters generally less than about 0.6 micrometer, preferably from 0.005 to about 0.4 micrometer, most preferably from about 0.005 to about 0.1 micrometer, which particles tend to form aggregates if not treated with a dispersant or surface active agent. When dispersed in water, these inorganic particulates tend to aggregate or agglomerate upon standing. Often, as a result of such agglomeration, the inorganic particles settle to the lower region of the aqueous dispersion. These solids are insoluble in water and hydrocarbon and are incapable of adsorbing more than 5 weight percent of hydrocarbon based on the weight of the solid. Examples of such inorganic solids are inorganic pigments such as titanium dioxide, zinc oxide, antimony oxide, magnesium oxide, fly ash, red oxide, yellow oxide, lemon chrome and cobalt blue; powders of metals including titanium, copper, brass, gold and stainless steel; carbonates such as calcium and magnesium carbonates; phosphates such as calcium and lead phosphates; silica and silicates such as clay and glass particles; chromates such as lead chromate; metal salts such as silver chloride; inert filler materials such as titanates and talc; ferrites; aluminum hydrates; and the like. Of particular interest are powders of metals and metal alloys such as aluminum, cobalt, iron, copper, nickel, chromium, zinc, palladium, silver, ruthenium, platinum, gold, rhodium, lead and alloys of these metals. Also of interest are the oxides of such metals, particularly magnetic oxides such as iron, nickel, cobalt or alloys thereof, as well as oxides of other elements such as titanium dioxide and silica. Of special interest are titanium dioxide that is preferably in the form of particles having an average diameter in the range from about 0.2 to about 0.4 micrometer, silica that is preferably in the form of particles having an average diameter from about 0.005 to about 0.2 micrometer, and the magnetic iron oxides of the formula $Fe_3O_4$ which are in the form of finely divided magnetic particles or ferrofluids as such are disclosed in U.S. Pat. No. 3,981,844, preferably those having an average particle diameter in the range from about 0.005 to about 0.1 micrometer. Typically, such fluids are aqueous dispersions of magnetic particles which are prepared by methods normally employed in comminuting metals and their ores, e.g., grinding and electrolysis or by precipitation methods. In both instances, chemical dispersants and/or surfactants as described hereinafter are used to maintain the aqueous dispersions in a reasonably stable state. Similar aqueous colloidal dispersions of nonmagnetic, inorganic solids are prepared by conventional techniques used in the manufacture of colloidal gold, calcium carbonate, titanium dioxide, silica and the like. Examples of such methods are described by A. King in *Inorganic Preparations,* Van Nostrand (1936); H. N. Holmes in *Manual of Colloid Chemistry,* MacMillan (1922); R. R. Myers et al. in *Pigments,* Marcel-Dekker (1975) and *Angew. Chem.,* International Ed., Vol. 19, 190–196 (1980).

The hydrophobic monomers employed in the practice of this invention are essentially water-immiscible, i.e., the monomer forms a separate phase when 5 g of monomer is mixed with 100 g of water. Such water-immiscible monomer(s) will polymerize under emulsion polymerization conditions to form a water-insoluble polymer which will exist in the form of a stable aqueous colloidal dispersion, usually with the aid of suitable surface active agents. Examples of suitable hydrophobic monomers include monovinylidene aromatic monomers such as styrene, vinyl toluene, t-butyl styrene, chlorostyrene, vinylbenzyl chloride and vinyl pyridene; alkyl esters of $\alpha,\beta$-ethylenically unsaturated acids such as ethyl acrylate, methyl methacrylate, butyl acrylate and 2-ethylhexyl acrylate; unsaturated esters of saturated carboxylic acids such as vinyl acetate, unsaturated halides such as vinyl chloride and vinylidene chloride; unsaturated nitriles such as acrylonitrile; dienes such as butadiene and isoprene; and the like. Of these monomers, the monovinylidene aromatics such as styrene and the alkyl acrylates such as butyl acrylate are preferred. In addition to the aforementioned hydrophobic monomer, relatively minor portions, e.g., less than 10, preferably less than 5, weight percent based on total monomer component, of a water-soluble monomer such as an ethylenically unsaturated carboxylic acid or its salt such as acrylic acid or sodium acrylate; methacrylic acid, itaconic acid and maleic acid; an ethylenically unsaturated carboxamide such as acrylamide; vinyl pyrrolidone; hydroxyalkyl acrylates and methacrylates such as hydroxyethyl acrylate, hydroxypropyl acrylate and hydroxyethyl methacrylate; aminoalkyl esters of unsaturated acids such as 2-aminoethyl methacrylate; epoxy functional monomers such as glycidyl methacrylate; sulfoalkyl esters of unsaturated acids such as 2-sulfoethyl methacrylate; ethylenically unsaturated quaternary ammonium compounds such as vinylbenzyl trimethyl ammonium chloride may be employed. It is critical, however, that such water-soluble monomers not be employed in amounts sufficient to render the resulting polymer soluble in water. Particularly effective monomer recipes for the practice of this invention are those containing from about 20 to about 90 weight percent of styrene, from about 10 to about 80 weight percent of alkyl acrylate such as butyl acrylate and from about 0.01 to about 2 weight percent of the unsaturated carboxylic acids such as acrylic acid, with said weight percentages being based on the weight of total monomers.

In the practice of this invention, it is preferred to initially prepare an aqueous colloidal dispersion of the inorganic solid by contacting said solid with an aqueous solution of a water-soluble surfactant or emulsifier thereby forming the dispersion which contains from about 5 to about 70 weight percent of the inorganic solid. Typically, suitable surface active agents or emulsifiers include salts of fatty acids such as potassium oleate, metal alkyl sulfates such as sodium lauryl sulfate, salts of alkyl aryl sulfonic acids such as sodium dodecylbenzene sulfonate, polysoaps such as sodium polyacrylate and alkali metal salts of methyl methacrylate/2-sulfoethyl methacrylate copolymers and other sulfoalkyl acrylate copolymers, and other anionic surfactants such as the dihexyl ester of sodium sulfosuccinic acid; nonionic surfactants such as the nonionic condensates of ethylene oxide with propylene oxide, ethylene glycol and/or propylene glycol; and cationic surfactants such as alkylamine-guanidine polyoxyethanols, as well as a wide variety of micelle generating substances described by D. C. Blackley in *Emulsion Polymerization,* Wiley and Sons, Chapter 7 (1975) and other surfactants listed in McCutcheon's *Detergents and Emulsifiers,* 1980 Annual, North American Edition, McCutcheon, Inc., Morristown, N.J. Also included among the suitable surfactants are the surface active polymers (often called polysoaps), e.g., those described in U.S. Pat. No. 3,965,032. Of the suitable surfactants, the anionic varieties such as the potassium salts of functionalized oligomers, e.g., Polywet varieties sold by Uniroyal Chemical, are preferred. Such surface active agents or emulsifiers are employed in amounts sufficient to provide a stable dispersion of the inorganic solid in water. Preferably, such surface active agents are employed in concentrations in the range from about 0.2 to about 10, most preferably from about 1 to about 6, weight percent based on the aqueous phase. Particularly desirable processes for forming such aqueous colloidal dispersions of inorganic solids are described in U.S. Pat. Nos. 3,826,667; 3,981,844; 3,843,540 and *Industrial Engineering Production and Research Development,* Vol. 19, 147–151 (1980).

The aqueous dispersion of inorganic solid is then combined with the water-immiscible monomer to form the desired emulsion by normal mixing procedures, for example, passing both the dispersion and monomer through a high shear mixing device such as a Waring blendor, homogenizer or ultrasonic mixer. Alternatively and preferably, the monomer is added continuously to the aqueous dispersion of inorganic solid during the polymerization. Advantageously, the monomer is in the form of an aqueous emulsion of the monomer which emulsion is maintained by a water-soluble monomer and/or a water-soluble emulsifier such as described hereinbefore. As another alternative, the aqueous emulsion of inorganic solid and water-immiscible monomer can be prepared by adding colloidal size inorganic particles to an existing aqueous emulsion of monomer. In such instances, it is often desirable to add additional emulsifier to the emulsion prior to or simultaneous with the addition of the inorganic solid. In the emulsion of inorganic solid and water-immiscible monomer, the aqueous phase is present in a proportion sufficient to be the continuous phase of the emulsion. The inorganic solid is present in proportions sufficient to provide the matrix particulate, with the desired characteristics, e.g., magnetic properties, pigmentation, etc. The water-immiscible monomer is present in proportion sufficient to enclose or encapsulate the inorganic solid when polymerized, and sufficient emulsifier and/or surface active agent is present to provide an aqueous colloidal emulsion which is sufficiently stable to be subjected to emulsion polymerization conditions. Preferably, the emulsion contains from about 0.1 to about 25 weight percent of inorganic solid, from about 1 to about 30 weight percent of monomer and a remaining amount of the aqueous phase including emulsifier (surfactant), catalyst and the like.

The emulsion polymerization conditions employed in the practice of this invention are generally conventional free-radical type polymerizations carried out in the presence of a radical initiator such as a peroxygen compound, an azo catalyst, ultraviolet light and the like. Preferably, such polymerization is carried out in the presence of a water-soluble peroxygen compound at temperatures in the range from about 50° to about 90° C. The emulsion is generally agitated during the polymerization period in order to maintain adequate feed transfer. The concentration is normally in the range from about 0.005 to about 8, preferably from about 0.01 to about 5, weight percent based on total monomer. Examples of suitable catalysts include inorganic persulfate compounds such as sodium persulfate, potassium persulfate, ammonium persulfate; peroxides such as hydrogen peroxide, t-butyl hydroperoxide, dibenzoyl peroxide and dilauroyl peroxide; azo catalysts such as azobisisobutyronitrile, and other common free-radical generating compounds. Also suitable are various forms of free-radical generating radiation means such as ultraviolet radiation, electron beam radiation and gamma radiation. Alternatively, a redox catalyst composition can be employed wherein the polymerization temperature ranges from about 25° to about 80° C. Exemplary redox catalyst compositions include a peroxygen compound as described hereinbefore, preferably potassium persulfate or t-butyl hydroperoxide and a reducing component such as sodium metabisulfite and sodium formaldehyde hydrosulfite. It is also suitable to employ various chain transfer agents such as mercaptans, e.g., dodecyl mercaptan; dialkyl xanthogen disulfides; diaryl disulfides and others listed in Blackley, supra, Chapter 8 in concentrations as described therein.

Following emulsion polymerization, the emulsion polymerizate can be withdrawn from the polymerization vessel and (1) the emulsion is employed as is or (2) the unreacted monomer and other volatiles are removed to form a concentrated emulsion and then used or (3) the matrix particulate can be separated from the aqueous continuous phase of the dispersion by conventional means such as drying under vacuum. The dried matrix particulate preferably contains from about 1 to about 70 weight percent of inorganic solid and from about 99 to about 30 weight percent of polymer matrix.

The following examples are given to illustrate the invention and should not be construed as limiting its scope. Unless otherwise indicated, all parts and percentages are by weight.

EXAMPLE 1

An aqueous dispersion of iron oxide ($Fe_3O_4$) is prepared by the procedure described in Table I, footnote (2).

To a 3-neck flask equipped with a stirrer, two addition funnels and a condenser is added a mixture of 507 g of the 28.3 percent solids dispersion of $Fe_3O_4$ (200 gauss and average particle size less than 0.5 micrometer) and 203 g of deionized water. The mixture is then heated under nitrogen atmosphere to 90° C. while stirring the mixture. At this temperature of 90° C., a monomer stream and an aqueous surfactant stream are separately introduced via the two addition funnels into the flask, each stream being introduced at the rate of 5.5–6.0 ml/min over a period of 90 minutes. The monomer stream consists of 64 g of styrene, 16 g of butyl acrylate and 3.0 g of t-butyl hydroperoxide. The aqueous stream consists of 80 g of deionized water, 1.25 g of a potassium salt of a functionalized oligomer sold by Uniroyal Chemical under the trade name "Polywet KX-4" and 2.0 g of sodium formaldehyde hydrosulfite. The resulting reaction mixture is stirred and maintained under nitrogen at 90° C. for an additional half hour. The resulting 24.6 percent solids latex is concentrated by distillation under vacuum to a 29.7 percent solids latex having dispersed particles with a polymeric as well as magnetic characteristic. The particles have a narrow particle size distribution and an average particle diameter of 0.107 micrometer as determined by hydrodynamic chromatography. The latex remains stable in an applied magnetic field of 60 gauss and exhibits properties common to magnetic colloids. For example, such magnetic colloids are magnetizable liquids that are instantly demagnetized upon removal of a magnetic field and levitate an object upon application of a magnetic field. Magnetization of the latex by a Collpits oscillator circuit technique, described by E. A. Peterson et al. in the *Journal of Colloidal and Interfacial Science*, 70, 3 (1977), is estimated to be 135 gauss.

EXAMPLE 2

A mixture of 7 g of Ferrofluid A-05 (200 gauss, 25.7 percent solids) sold by Ferrofluidics Corporation, Burlington, MA; 1 g of a 10 percent aqueous solution of the dihexyl ester of sodium sulfosuccinic acid and 140 g of water are converted to an aqueous dispersion with an ultrasonic probe operating at 90 percent capacity for 2 minutes. The resulting dispersion is added to 15 g of styrene containing 0.1855 g of t-butyl peroxide. The dispersion is heated with agitation under a nitrogen atmosphere to 93° C. A 0.05-g portion of sodium formaldehyde hydrosulfite dissolved in 2 ml of water is introduced into the dispersion. The polymerization reaction is continued for 2 hours to form an aqueous colloidal dispersion containing 10.3 percent solids. The resulting matrix particulate is recovered in the form of an aqueous dispersion which is responsive to a magnetic field. Electromicrographs of individual matrix particles show them to have a polymer matrix enclosing discrete particles of the Ferrofluid. Many matrix particles are observed to contain more than one discrete particle of magnetic iron oxide. The average particle diameter of the matrix particulate is about 0.085 micrometer.

EXAMPLE 3

A 40-g portion of Ferrofluid A-01 (50 gauss) containing 7.2 percent solids is centrifuged on a high speed laboratory centrifuge for 6 hours at 17,000 rpm. A 3.8-g portion of sediment (60 percent solids) is recovered from the centrifugation and redispersed in 15 g of an aqueous solution containing 5 percent of potassium oleate and 3.2 g of an aqueous solution containing 4 percent of the dihexyl ester of sodium sulfosuccinic acid. The resulting dispersion is combined with 230 g of deionized water and then agitated using an ultrasonic probe. To the resulting dispersion is added 25 g of styrene and 0.2 g of t-butyl peroxide. The dispersion is heated under nitrogen with agitation to a temperature of 90° C. The dispersion contains 0.88 percent of $Fe_3O_4$, 0.3 percent of potassium oleate, 0.04 percent of the dihexyl ester, 9.1 percent of styrene and 0.76 percent of t-butyl peroxide. At this point, 0.05 g of sodium formaldehyde hydrosulfite dissolved in 2 ml of water is introduced into the dispersion and the polymerization reaction is allowed to proceed for 30 minutes. Following this time, a 9.4 percent solids polymer matrix latex of polymer matrix iron particles is recovered wherein the average particle diameter of the matrix particles is 0.08 micrometer.

EXAMPLE 4

A 3.8-g sample of the sediment as prepared in Example 2 is dispersed in 15 g of an aqueous solution of 5 percent of potassium oleate. This dispersion is combined with 220 g of deionized water and agitated with an ultrasonic probe. To this dispersion is added 25 g of styrene and 0.196 g of t-butyl hydroperoxide. This dispersion contains 0.9 percent of $F_3O_4$, 0.28 percent of oleate, 9.47 percent of styrene and 0.07 percent of t-butyl peroxide. The resulting dispersion is heated under nitrogen with agitation to 90° C. and 0.05 g of sodium formaldehyde hydrosulfite is added to the dispersion. The reaction is allowed to proceed for 30 minutes. The resulting latex of encapsulated iron particles contains 7.4 percent solids.

Similar results are achieved with the foregoing procedure when sodium lauryl sulfate, sodium dihexyl sulfosuccinate, methyl methacrylate/2-sulfoethyl methacrylate/acrylic acid (67/6/27) terpolymer, methyl methacrylate (80/20) copolymer, methyl methacrylate/2-sulfoethyl methacrylate (85/15) copolymer or mixture of two or more of same is substituted for the potassium oleate. In the aforementioned polymers, the numbers in parenthesis represent mole percentages of the individual monomers.

EXAMPLE 5

I. Dispersion of Inorganic Solid

Except for the magnetic iron oxide of Sample No. 11 of the following table, several pigment dispersions are prepared by dispersing the pigment specified in Table I in an aqueous solution of a potassium salt of a functionalized oligomer sold by Uniroyal Chemical under the trade name "Polywet KX-4." The dispersion of magnetic iron oxide is prepared according to footnote (2) of the following table. Dispersion is achieved by using an ultrasonic probe 3 times operating at 90 percent capacity for 5 minutes each time. The dispersion is allowed to stand overnight and the top layer containing the colloidal dispersed pigment is decanted and retained for the subsequent polymerization.

II. Polymerization

Each of the aforementioned pigment dispersions is subjected to the following emulsion polymerization procedure.

A mixture of 14.5 g of one of the pigment dispersions specified in Table I, 150 g of deionized water and 1.7 g of 1N NaOH is prepared by using an ultrasonic probe operating at 90 percent capacity for 4 minutes. This mixture is charged to a one-liter, 3-neck flask equipped with a stirrer, condenser and 2 addition funnels. The mixture is heated with agitation under nitrogen to 90° C. A monomeric stream consisting of 20 g of styrene and 20 g of butyl acrylate and an aqueous stream consisting of 45 g of deionized water, 1.5 g of a 40 percent solution of Polywet KX-4 in water, 1 g of 1N NaOH and 0.75 g of sodium persulfate are each added at the rate of about 2 ml/minute. After addition of the monomer and aqueous stream is completed, the resulting reaction mixture is maintained under nitrogen and with agitation at 90° C. for 40 minutes. The resulting latex is placed under vacuum with agitation to remove unreacted monomer and water thereby providing a latex, herein called "a dispersion of a matrix particulate."

The several aqueous dispersions of matrix particulates are described in Table I.

TABLE I

| Sample No. | Pigment Dispersion | | | | Monomer[3] | | Emulsifier[4] | | Initiator[5] | | % Solids [6] | Average Particle Diameter $\mu m$[7] |
|---|---|---|---|---|---|---|---|---|---|---|---|---|
| | Pigment[1] | | Dispersant[2] | | | | | | | | | |
| | Type | Avg Part Size, $\mu m$ | Amt Wt % | Type | Amt Wt % | Type | Wt Ratio of Monomer | Amt Wt % | Type | Amt Wt % | Type | Amt Wt % | |
| 1 | $TiO_2$ | <0.45 | 2.3 | KX-4 | 0.6 | S/BA | 1:1 | 15.7 | KX-4 | 0.43 | $Na_2S_2O_8$ | 0.29 | 17.8 | 0.53 (0.114) |
| 2 | $TiO_2$ | " | 5.5 | " | 2.0 | S/BA | 1:1 | 18.4 | " | 0.20 | " | 0.13 | 24.3 | 0.65 (0.15) |
| 3 | $TiO_2$ | " | 10.2 | " | 0.25 | S/BA | 1:1 | 17.0 | " | 0.78 | " | 0.16 | 28.1 | 0.74 (0.12) |
| 4 | $TiO_2$ | " | 11.7 | " | 0.36 | S/BA | 1:1 | 7.8 | " | 0.58 | " | 0.20 | 20.2 | 0.68 (0.118) |
| 5 | $CaCO_3$ | <0.09 | 1.3 | " | 0.036 | S/BA | 1:1 | 12.7 | " | 0.30 | " | 0.20 | 14.0 | 0.42 |
| 6 | ZnO | <0.11 | 5.6 | " | 0.50 | S/BA | 9:1 | 18.7 | " | 0.48 | " | 0.16 | 23.8 | 0.38 |
| 7 | ZnO | " | 13.6 | " | 0.64 | S/BA | 9:1 | 13.5 | " | 0.35 | " | 0.11 | 27.2 | 0.31 |
| 8 | Clay | <0.38 | 6.5 | " | 0.70 | S/BA | 1:1 | 19.2 | " | 0.23 | " | 0.12 | 25.0 | 0.85 |
| 9 | Silica | <0.045 | 5.6 | " | 1.0 | S/BA | 1:1 | 18.7 | " | 0.20 | " | 0.07 | 23.5 | 0.12 |
| 10 | Silica | " | 6.5 | " | 1.2 | S/BA | 1:1 | 12.9 | " | 0.06 | " | 0.05 | 19.5 | 0.116 |
| 11 | Magnetic Iron Oxide | <0.035 | 7.3 | " | 4.5 | S/BA | 4:1 | 8.1 | " | 0.01 | TBHP | 0.18 | 19.6 | 0.09 |

[1]Average particle size in micrometers ($\mu m$) as measured by electron microscopy. Weight percent of pigment based on weight of aqueous dispersion of matrix particulate.
[2]KX-4 = Polywet KX-4 sold by Uniroyal Chemical. Weight percent of dispersant based on weight of aqueous dispersion of matrix particulate. In the preparation of the iron oxide dispersion of Sample No. 11, an aqueous solution of ferric and ferrous salts are mixed in amounts to maintain the $Fe^{+3}/Fe^{+2}$ molar ratio at ~2:1. Magnetic iron oxide is then precipitated at 0°-10° C. by rapid addition of 1N $NH_4OH$ and vigorous agitation until pH of 9-10 is reached. Immediately thereafter, the dispersant is introduced with agitation to the aqueous medium containing the precipitated iron oxide and the mixture is heated at 90° C. for one hour. During this period, hydrochloric acid is added until the pH of the mixture reaches 7.5. The particles of precipitated iron oxide are washed with deionized water and redispersed in deionized water containing additional dispersant by using an ultrasonic probe. Magnetization of the dispersed iron oxide is measured by a Collpits oscillator circuit technique.
[3]S = styrene, BA = butyl acrylate. Weight percent of monomer based on weight of aqueous dispersion of matrix particulate.
[4]KX-4 = same as in [2] of this Table. Weight percent of emulsifier based on weight of aqueous dispersion of matrix particulate.
[5]TBHP = tert-butyl hydroperoxide. Weight percent of initiator based on weight of aqueous dispersion of matrix particulate.
[6]% Solids determined by freezing aqueous dispersion of matrix particulate in methylene chloride/dry ice bath and drying the dispersion at 1 mm Hg for 36 hours. The solids (matrix particulate) are then weighed and converted to % solids by dividing weighed solids by weight of the aqueous dispersion of matrix particulate. The dried matrix particulate is compression molded at 125° C. to form a disk (2.54 cm diameter and 1.27 cm thick).
[7]Average particle diameter determined by hydrodynamic chromatography. Sample Nos. 1-4 represent bimodal systems with the diameter for each mode being shown separately.

EXAMPLE 6

Using a Waring blender, a 150-g portion of titanium dioxide having an average particle size in the range of 0.2–0.4 micrometer is dispersed in 350 g of deionized water containing 0.3 g of an ethanolated alkylguanidine amine complex sold by American Cyanamid under the trade name Aerosol C-61. The resulting dispersion is then combined with mixing with 240 g of deionized water containing 15 g of a 40 percent solution of Polywet KX-4 in water.

This dispersion (471 g) is combined with 248 g of deionized water, 4 g of a 40 percent solution of Polywet KX-4 in water, 3 g of 1N NaOH and 0.8 g of a 1 percent solution of the pentasodium salt of (carboxymethylimino) bis(ethylenenitrilo)tetraacetic acid in water. The resulting mixture is charged to a 3-neck flask equipped with a stirrer, two addition funnels and a condenser. The mixture is stirred and heated under nitrogen to 90° C. At this temperature, (1) a monomer stream consisting of 40 g of styrene and 40 g of butyl acrylate and (2) an aqueous stream consisting of 80 g of deionized water, 10 g of a 40 percent solution of Polywet KX-4 in water, 2.2 g of $Na_2S_2O_8$ and 9 g of 1N NaOH are introduced into the flask with each stream being introduced at the rate of ~2 ml/min. After the addition of the monomer and aqueous streams is completed, the resulting mixture is maintained at 90° C. under nitrogen and agitation for an additional 30 minutes. The resulting latex which contains 19.4 percent solids is concentrated via evacuation to a 55 percent solids dispersion which is a bimodal dispersion wherein one mode has an average particle diameter of 0.65 micrometer and the other mode has an average particle diameter of 0.11 micrometer.

A coating is prepared from the latex that exhibits excellent opacity.

What is claimed is:

1. A method for preparing a colloidal size particulate comprising the steps of (1) emulsifying at least one hydrophobic, emulsion polymerizable monomer in an aqueous colloidal dispersion of discrete particles of an inorganic solid, said dispersion being maintained in a reasonably stable state with a chemical dispersant and/or surfactant, and (2) subjecting the resulting emulsion to emulsion polymerization conditions to form a stable, fluid aqueous colloidal dispersion of the particulate wherein essentially every particle of the inorganic solid is coated with the hydrophobic polymer resulting from said polymerization such that substantially all of the inorganic particles are maintained in a discrete spaced apart relationship to each other by the hydrophobic polymer; the dispersion further characterized in that when the inorganic solid is magnetic, the dispersion remains stable in any applied magnetic field.

2. The method of claim 1 wherein the particles of the inorganic solid have an average diameter less than 0.6 micrometer.

3. The method of claim 1 wherein the inorganic solid is magnetic iron oxide having an average particle diameter in the range from about 0.005 to about 0.1 micrometer and a substantial portion of the particles of said particulate comprises a matrix of the hydrophobic polymer containing two or more iron oxide particles.

4. The method of claim 2 wherein the aqueous dispersion of the inorganic solid is prepared by contacting said solid with an aqueous solution of a water-soluble surfactant and the same surfactant is used to emulsify the monomer in the aqueous dispersion of inorganic solid.

5. The method of claim 2 wherein the inorganic solid is silica having an average particle diameter in the range from about 0.005 to about 0.1 micrometer.

6. The method of claim 2 wherein the inorganic solid is titanium dioxide having an average particle diameter in the range from about 0.2 to about 0.4 micrometer.

7. The method of claim 2 wherein the inorganic solid is iron oxide, titanium dioxide, calcium carbonate, silica, zinc oxide or clay.

8. The method of claim 1 wherein a water-soluble surfactant is used to emulsify the hydrophobic monomer, said surfactant being a potassium salt of a functionalized oligomer or a salt of a fatty acid.

9. The method of claim 1 wherein the emulsion contains from about 0.1 to about 25 weight percent of the inorganic solid, from about 1 to about 30 weight percent of the monomer(s) and a remaining amount of aqueous phase including emulsifier and/or surfactant and catalyst.

10. The method of claim 6 wherein the monomer is a monovinylidene aromatic monomer, an alkyl ester of an ethylenically unsaturated carboxylic acid or a mixture thereof.

11. A stable, fluid aqueous colloidal dispersion comprising a continuous aqueous phase and a polymer/inorganic solid disperse phase wherein a substantial portion of the particles of the disperse phase comprise a hydrophobic polymer matrix having dispersed therein the colloidal inorganic solid particles such that substantially all of the inorganic particles are maintained in a discrete spaced apart relationship to each other by the hydrophobic polymer; the dispersion further characterized in that when the inorganic solid is magnetic, the dispersion remains stable in any applied magnetic field.

12. The dispersion of claim 8 wherein the inorganic solid is iron oxide, titanium dioxide, calcium carbonate, silica, zinc oxide or clay.

13. The dispersion of claim 8 wherein the polymer is a polymer of a monovinylidene aromatic monomer, an alkyl ester of an unsaturated carboxylic acid or a mixture thereof.

14. The dispersion of claim 11 wherein the inorganic solid is magnetic and the dispersion exhibits the characteristics of a magnetic colloid.

15. The dispersion of claim 13 wherein the polymer is a polymer of styrene and butyl acrylate.

16. A particulate having colloidal size particles wherein substantially all of said particles comprise a hydrophobic polymer matrix and at least one discrete colloidal particle of an inorganic solid dispersed in said matrix, said inorganic solid being iron oxide, titanium dioxide, calcium carbonate, silica, zinc oxide or clay; the particulate further characterized in that when the inorganic solid is iron oxide and the particulate is in an aqueous dispersion, the dispersion is stable in any applied magnetic field.

17. The particulate of claim 16 wherein the inorganic solid is titanium dioxide, calcium carbonate, silica, zinc oxide or clay.

18. The particulate of claim 16 which contains from about 1 to about 70 weight percent of inorganic solid and from about 30 to about 99 weight percent of matrix polymer.

19. The particulate of claim 16 wherein the inorganic solid is iron oxide having an average particle diameter in the range from about 0.005 to about 0.1 micrometer.

20. The particulate of claim 16 wherein the inorganic solid is titanium dioxide having an average particle diameter in the range from about 0.2 to about 0.4 micrometer.

21. The particulate of claim 12 wherein the inorganic solid is titanium dioxide and the particulate is a bimodal one with one mode having an average particle size in the range from about 0.1 to about 0.15 micrometer and the other mode having an average particle diameter in the range from about 0.6 to about 0.75 micrometer.

* * * * *